United States Patent
Fox et al.

(10) Patent No.: US 10,834,036 B2
(45) Date of Patent: Nov. 10, 2020

(54) ENHANCEMENT OF REAL-TIME MESSAGE VERBOSITY

(71) Applicant: International Business Machines Corporation, Armonk, NY (US)

(72) Inventors: Jeremy R. Fox, Georgetown, TX (US); Kelley Anders, East New Market, MD (US); Sonya Leech, Mulhuddart (IE); Jonathan Dunne, Dungarvan (IE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/293,637

(22) Filed: Mar. 6, 2019

(65) Prior Publication Data
US 2020/0287854 A1    Sep. 10, 2020

(51) Int. Cl.
*G06F 15/16* (2006.01)
*H04L 12/58* (2006.01)
*G06F 40/253* (2020.01)

(52) U.S. Cl.
CPC .......... *H04L 51/063* (2013.01); *G06F 40/253* (2020.01); *H04L 51/046* (2013.01); *H04L 51/38* (2013.01)

(58) Field of Classification Search
CPC ..... H04L 51/063; H04L 51/046; H04L 51/38; G06F 40/253
USPC ......................................................... 709/206
See application file for complete search history.

(56) References Cited

U.S. PATENT DOCUMENTS

| | | | |
|---|---|---|---|
| 10,097,485 B2 | 10/2018 | Huang et al. | |
| 2002/0103870 A1 | 8/2002 | Shouji | |
| 2014/0033262 A1 | 1/2014 | Anders et al. | |
| 2017/0147202 A1 | 5/2017 | Donohue | |
| 2017/0193091 A1* | 7/2017 | Byron | G06F 40/205 |
| 2018/0006979 A1* | 1/2018 | Barsness | H04L 51/36 |
| 2018/0032500 A1 | 2/2018 | Deluca et al. | |
| 2020/0012718 A1* | 1/2020 | Kung | H04L 51/04 |
| 2020/0065381 A1* | 2/2020 | Chui | G06F 40/30 |

FOREIGN PATENT DOCUMENTS

WO    2018107921 A1    6/2018

* cited by examiner

*Primary Examiner* — Wing F Chan
*Assistant Examiner* — Joseph R Maniwang
(74) *Attorney, Agent, or Firm* — North Shore Patents, P.C.; Michele Liu Baillie

(57) ABSTRACT

In enhancing real-time message verbosity, a computing device analyzes a prior message corpus for a sender over multiple vectors. The computing device derives the prior message model from results of the analysis of the prior message corpus. When the computing device receives new message text composed at the sender, the computing device applies a prior message model to the new message text. The prior message model representing behavior of the sender in prior message discourses with different communication device types and different message types. The computing device identifies a set of candidate texts based on the prior message model and inserts the set of candidate texts into the new message text to form modified message text. The computing device validates a readability of the modified message text and sends the modified message text to the sender device. The sender device then sends the modified message text to a recipient device.

17 Claims, 9 Drawing Sheets

501

| Device | Desktop Client | | | | | | | Inter-arrival time (ms) |
|---|---|---|---|---|---|---|---|---|
| loglikelihood | 0.4567 | 0.5678 | 0.4656 | 0.8979 | 0.8778 | 0.567 | 0.123 | |
| word | I | figured | they | could | probably | be | merged | 0 |
| loglikelihood | 0.209 | 0.209 | 0.209 | 0.209 | 0.345 | 0.456 | 0.456 | |
| word | into | one | script | without | too | much | trouble | 123 |
| loglikelihood | 0.107 | 0.107 | 0.107 | 0.107 | 0.346 | 0.456 | 0.237 | |
| word | But | whatever | is | easiest | for | you | ! | 98 |
| loglikelihood | 0.4567 | 0.3678 | 0.4656 | 0.8979 | 0.8778 | 0.567 | 0.123 | |
| word | was | more | than | happy | to | provide | a | 102 |
| loglikelihood | 0.209 | 0.209 | 0.209 | 0.345 | 0.456 | 0.456 | | |
| word | script | from | our | old | code | repo | | 112 |

503

Sender ID = acque127
Receiver ID = luydh456
Jaccard Index = 0.23

502

| Device | Android | | | | | | | Inter-arrival time (ms) |
|---|---|---|---|---|---|---|---|---|
| loglikelihood | 0.4567 | 0.5678 | 0.4656 | 0.8979 | 0.8778 | 0.567 | 0.123 | |
| word | | | they | could | | be | merged | 0 |
| loglikelihood | 0.209 | 0.209 | 0.209 | 0.209 | 0.345 | 0.456 | 0.456 | |
| word | into | one | script | | | | | 89 |
| loglikelihood | 0.107 | 0.107 | 0.107 | 0.107 | 0.346 | 0.456 | 0.237 | |
| word | | whatever | is | easiest | | | ! | 102 |
| loglikelihood | 0.4567 | 0.3678 | 0.4656 | 0.8979 | 0.8778 | 0.567 | 0.123 | |
| word | was | | | happy | to | provide | a | 65 |
| loglikelihood | 0.209 | 0.209 | 0.209 | 0.345 | 0.456 | 0.456 | | |
| word | script | | | | | | | 23 |

FIG. 5A

601 Message Inter-Arrival Time Analysis:

```
library(fitdistrplus)
data("groundbeef", package = "fitdistrplus")
my_data <- groundbeef$serving
plot(my_data, pch=20)
plotdist(my_data, histo = TRUE, demp = TRUE)
descdist(my_data, discrete=FALSE, boot=500)
fit_w  <- fitdist(my_data, "weibull")
fit_g  <- fitdist(my_data, "gamma")
fit_ln <- fitdist(my_data, "lnorm")
fit_ll <- fitdist(my_data, "llogis", start = list(shape = 1,
scale = 500))
fit_P  <- fitdist(my_data, "pareto", start = list(shape = 1,
scale = 500))
fit_B  <- fitdist(my_data, "burr",   start = list(shape1 = 0.3,
shape2 = 1, rate = 1))
summary(fit_ln)

par(mfrow=c(2,2))
plot.legend <- c("Weibull", "lognormal", "gamma")
denscomp(list(fit_w, fit_g, fit_ln), legendtext = plot.legend)
cdfcomp (list(fit_w, fit_g, fit_ln), legendtext = plot.legend)
qqcomp  (list(fit_w, fit_g, fit_ln), legendtext = plot.legend)
ppcomp  (list(fit_w, fit_g, fit_ln), legendtext = plot.legend)
```

FIG. 6A

602 Closeness of Relationship Analysis:

```
from math import* def jaccard_similarity(x,y):

intersection_cardinality = len(set.intersection(*[set(x),
set(y)]))
 union_cardinality = len(set.union(*[set(x), set(y)]))
 return intersection_cardinality/float(union_cardinality)

print jaccard_similarity([0,1,2,5,6],[0,2,3,5,7,9])
```

FIG. 6B

603 Word2vec Analysis:

```
# imports needed and logging
import gzip
import gensim
import logging logging.basicConfig(format='%(asctime)s : %(levelname)s : %(message)s', level=logging.INFO)

def read_input(input_file):
  """This method reads the input file which is in gzip format"""

logging.info("reading file {0}...this may take a while".format(input_file))
  with gzip.open(input_file, 'rb') as f:
    for i, line in enumerate(f):

if (i % 10000 == 0):
        logging.info("read {0} reviews".format(i))
      # do some pre-processing and return list of words for each review
      # text
      yield gensim.utils.simple_preprocess(line)

# build vocabulary and train model
  model = gensim.models.Word2Vec(
    documents,
    size=150,
    window=10,
    min_count=2,
    workers=10)
  model.train(documents, total_examples=len(documents), epochs=10)
```

FIG. 6C

ENHANCEMENT OF REAL-TIME MESSAGE VERBOSITY

BACKGROUND

The exchange of information can occur using different types of communication devices, such as desktop computers, lap top computers, mobile phones, tablets, smart watches, etc. These communication devices are able to send multiple types of messages, such as online chat messages, SMS messages, or email messages. A message sender enters messages differently depending on the type of communication device, even with the same message type. For example, a chat message composed on a laptop computer would be more verbose than if composed on a mobile phone, due to the type of communication device being used. However, the smaller the vocabulary or the less verbose the message, the more problematic the interpretation by the recipient can be. The verbosity of the message impacts the interpretation of the message by the recipient, where some meaning can be lost or misunderstood.

SUMMARY

Disclosed herein is a method for enhancing real-time message verbosity, and a computer program product and system as specified in the independent claims. Embodiments of the present invention are given in the dependent claims. Embodiments of the present invention can be freely combined with each other if they are not mutually exclusive.

According to an embodiment of the present invention, a computing device analyzes a prior message corpus for a sender over a plurality of vectors. The computing device derives the prior message model from results of the analysis of the prior message corpus. When the computing device receives new message text composed by the sender at a sender device, the computing device applies a prior message model to the new message text. The prior message model representing behavior of the sender in prior message discourses with different communication device types and different message types. The computing device identifies a set of candidate texts based on the prior message model and inserts the set of candidate texts into the new message text to form modified message text. The computing device validates a readability of the modified message text and sends the modified message text to the sender device. The sender device then sends the modified message text to a recipient device.

In one aspect of the present invention, in deriving the prior message model, the computing device models inter-arrival time of prior messages posted by the sender, determines a closeness of relationship between the sender and a recipient of the new message text, performs a prior message discourse analysis on the prior message corpus between the sender and the recipient from distinct communication device types, and combines the results into the prior message model.

In one aspect of the present invention, the computing device identifies a set of candidate collocation texts based on the prior message model, identifies a subset of a set of candidate collocation texts based on a combination of a first device identifier for the sender device and a second device identifier for a recipient device of a recipient of the new message text, and inserts the subset of collocation texts into the new message text to form the modified message text.

BRIEF DESCRIPTION OF THE DRAWINGS

FIGS. 5A-5B illustrate an example message with verbosity enhanced according to some embodiments.

FIGS. 6A-6C illustrate example logic for the message inter-arrival time analysis, the Jaccard index calculation, and the Word2vec analysis.

DETAILED DESCRIPTION

Figure 1:
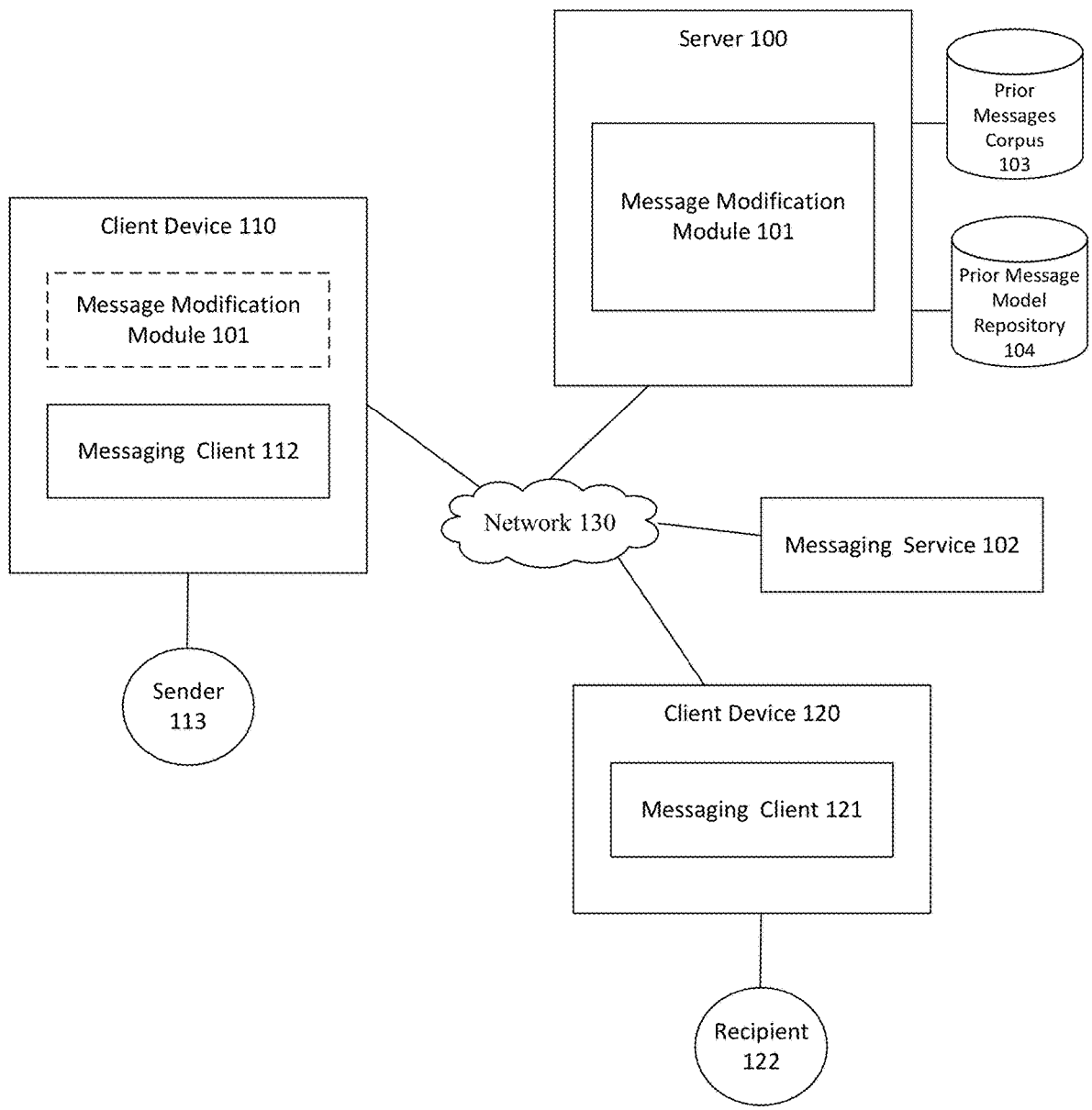
FIG. 1 illustrates a computing environment for enhancing real-time message verbosity according to some embodiments.

FIG. 1 illustrates a computing environment for enhancing real-time message verbosity according to some embodiments. The computing environment includes a messaging service 102 for facilitating the exchange of messages between users over a network 130. The messaging service 102 can include, but is not limited to, chat messaging services, SMS services, and email service. The computing environment further includes a server 100 configured to communicate with a plurality of client devices 110, 120 over the network 130. The network 130 can include, but is not limited to, a public network, an enterprise network, or another type of network over which the client devices 110, 120 may exchange real-time messages. A first client device 110 includes a messaging client 112 through which a sender 113 composes messages to one or more recipients 122. The recipient 122 receives the message through a messaging client 121 at a second client device 120. The server 100 includes a message modification module 101 for intercepting the messages prior to their delivery to the messaging client 121 of the recipient 122 and modifying the verbosity of the messages. In modifying the verbosity of the message, the message modification module 101 uses a prior messages corpus 103 and prior message models stored in a repository 104. Optionally, the message modification module 101 can reside locally at the sender's client device 110 and configured with access to the prior message corpus 103 and the prior message model repository 104, either locally or remotely over the network 130. The functions of the illustrated components in the enhancement of real-time message verbosity are further described below.

Figure 2:
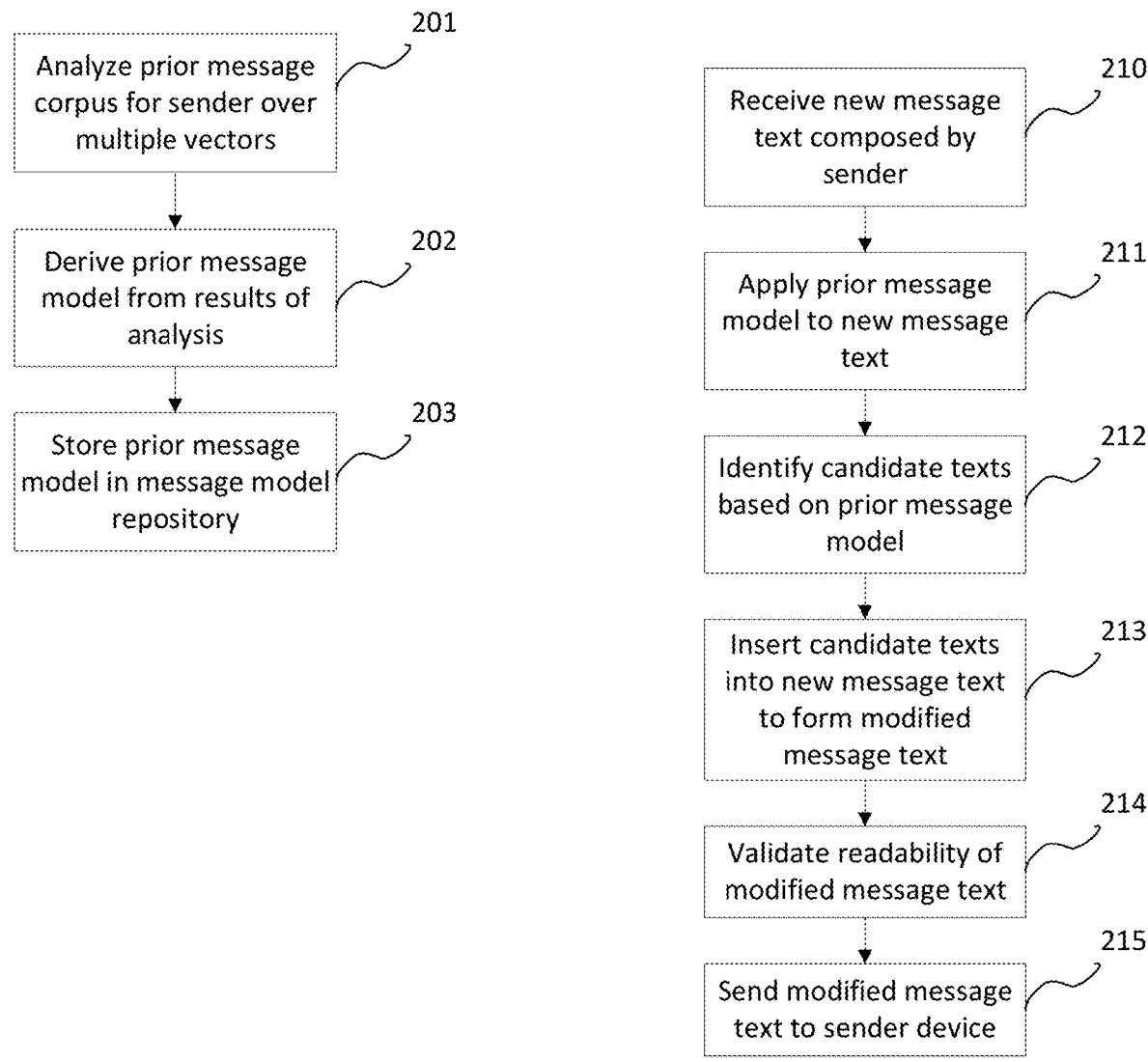
FIG. 2 illustrates a method for enhancing real-time message verbosity according to some embodiments.

FIG. 2 illustrates a method for enhancing real-time message verbosity according to some embodiments. Prior to modifying the verbosity of message, the message modification module 101 derives a baseline model of the messaging behavior of a sender 113 based on the sender's prior messaging history. To derive the baseline model, the message modification module 101 analyzes a prior message corpus for the sender 113 over multiple vectors (201). From the results of the analysis, the message modification module 101 derives a prior message model for the sender 113 (202), which is then stored in the message model repository 104 (203).

Figure 3:
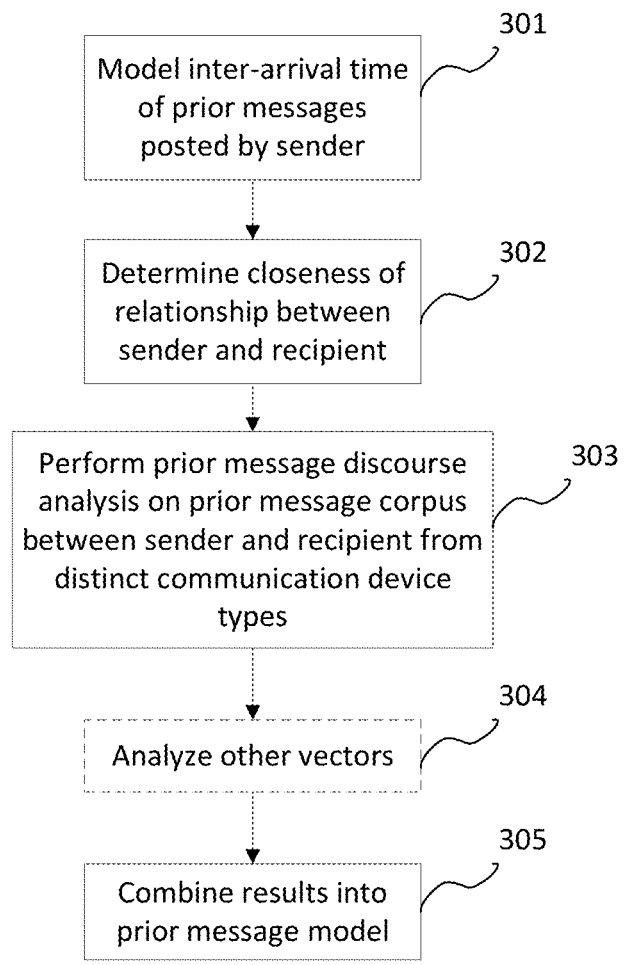
FIG. 3 illustrates in more detail the derivation of the prior message model.

FIG. 3 illustrates in more detail the derivation of the prior message model. According to some embodiments, the prior message corpus 103 of the sender 113 is analyzed over at least four vectors: message inter-arrival time; closeness of relationships between users; communication device types used in message exchange; and the words used in prior message discourses. The analyses of these vectors provide reasonable fidelity in the enhancement of message verbosity. The message modification module 101 retrieves the corpus 103 of prior messages posted by the sender 113 and models the inter-arrival time of the prior messages (301). In some embodiments, the duration between each message posted by the sender 113 is modeled and a probability density distribution is fit to the data. For example, a maximum likelihood estimation or a moment of moments analysis can be used to determine the most plausible distribution. In statistics, the maximum likelihood estimation (MLE) and the moment of moments analysis are methods of estimating the parameters of a statistical model, given observations. The MLE obtains the parameter estimates by finding the parameter values that maximize the likelihood function. The moment of moments method starts by expressing the population moments (i.e., the expected values of powers of the random variable under consideration) as functions of the parameters of interest. These expressions are then set equal to the sample moments. The number of such equations is the same as the number of parameters to be estimated. The equations are then solved for the parameters of interest, and the solutions are estimates of the parameters. A statistical test, such as the Anderson-Darling test, can then be used to validate the goodness of the fit. FIG. 6A illustrates example logic 601 for the message inter-arrival time analysis. The message modification module 101 further determines the closeness of the relationship between the sender 113 and the recipient 122 (302). In some embodiments, a Jaccard index is calculated between the sender 113 and the recipient 122. The Jaccard index can then be used to compare the similarity and diversity of sample sets. FIG. 6B illustrate example logic 602 for calculating a Jaccard index. The message modification module 101 further performs a prior discourse analysis using the prior message corpus 103 between the sender 113 and the recipient 122 from distinct communication device types (303). Through this analysis, the message exchanges between the sender 113 and the recipient 122 are analyzed for the combination of communication devices used, such as desktop computer to mobile phone, mobile phone to mobile phone, mobile phone to desktop computer, etc. A corpus linguistic analysis (i.e., collocation determination) and weight modeling of sparse and verbose communication models can be used to determine the relationship between the words used in the prior message corpus 103. For example, Word2vec or GLoVe models can be used. FIG. 6C illustrates example logic 603 for the Word2vec analysis. Either a verbose linguistic model or a sparse linguistic model can be used, depending on the combination of communication devices used between the sender 113 and recipient 122. Other vectors can be analyzed as well (304), such as an emotive analysis or a sentiment analysis, without departing from the spirit and scope of the present invention. The message modification module 101 combines the results from blocks 301-304 into the prior message model (305). In some embodiments, the combined results are stored as a matrix comprising arrays of results from the inter-arrival time analysis, the relationship closeness analysis, the type of communication devices used, and the prior message discourse analysis.

Returning to FIG. 2, when the sender 113 composed a new message, the new message text is sent to the message modification module 101 by the sender messaging client 112. Upon receiving the new message text (210), the message modification module 101 retrieves the prior message model for the sender 113 from the repository 104 and applies the prior message model to the new message text (211). In some embodiments, different prior message models are derived for different domains to capture variations in the sender's messaging behavior based on the content of the messages. For example, sender behavior may vary between domains in which the sender is an expert and domains in which the sender is a layperson. Techniques, such as corpus linguistics or natural language processing, can then be used to determine the domain of the new message text, and the prior message model associated with this domain is retrieved and applied. Based on the prior message model, the message modification module 101 identifies candidate texts (212) and inserts the candidate texts into the new message text to form a modified message text (213). By inserting the candidate texts, the verbosity of the new message text is enhanced. The message modification module 101 then validates the readability of the modified message text (214) and sends the modified message text to the sender device 110 (215). The sender 113 can then send the modified message text to the recipient 122 via the messaging service 102 and the messaging client 121.

Figure 4:
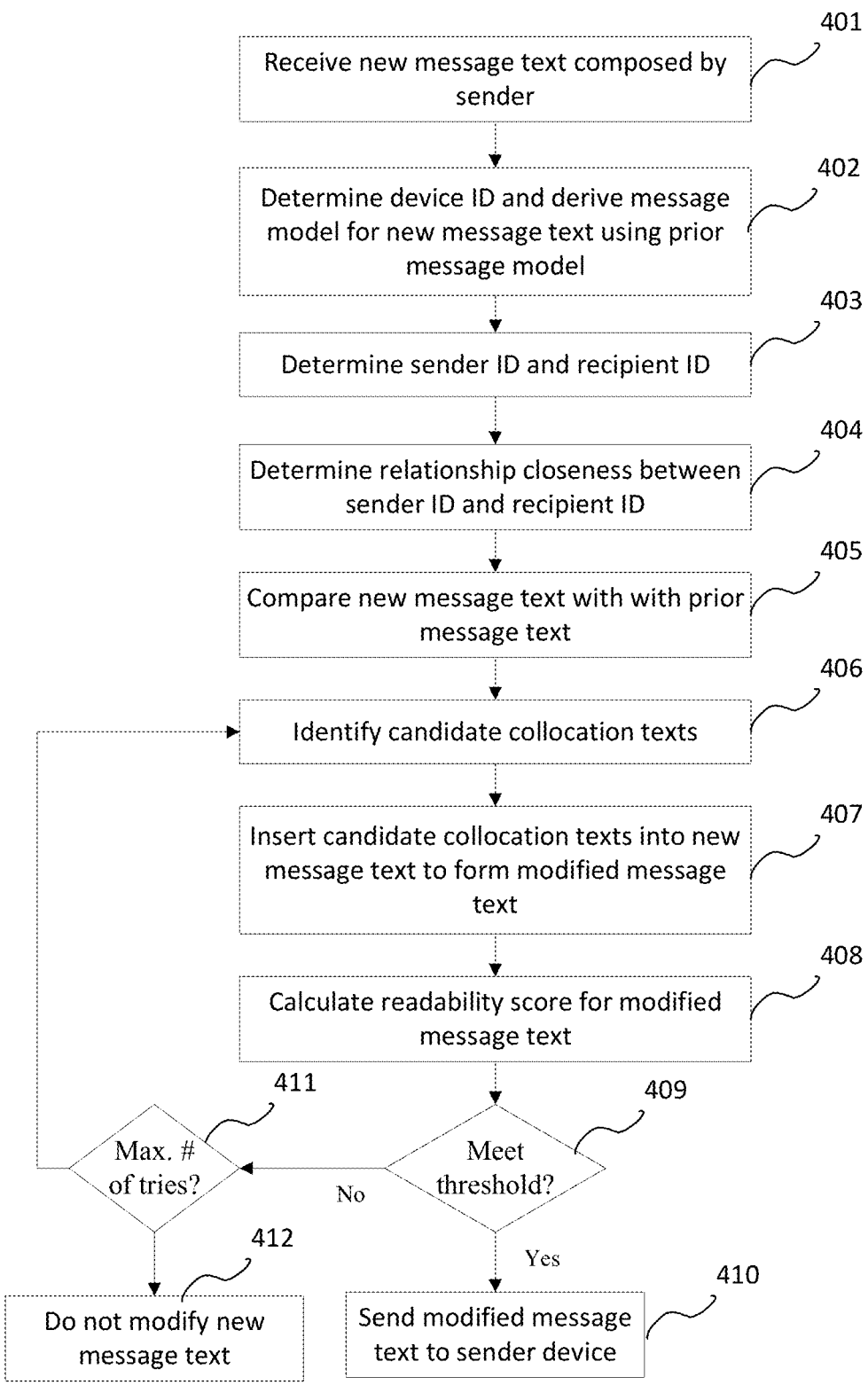
FIG. 4 illustrates in more detail the enhancement of real-time message verbosity using a prior message model according to some embodiments.

FIG. 4 illustrates in more detail the enhancement of real-time message verbosity using a prior message model according to some embodiments. The messaging client 112 is configured to send new message text input by the sender 113 to the message modification module 101. In some embodiments, the new message text is sent while the text is inputted by the sender 113. In other embodiments, the new message text is sent after the sender completes the composition of the message. When the message modification module 101 receives the new message text (401), the message modification module 101 determines the device ID of the sender client device 110 and derives a message model for the new message text using the prior message model (402). The message modification module 101 also determines the sender identifier (sender ID) and the recipient identifier (recipient ID) (403), such as by examining the new message metadata. The message modification module 101 determines the relationship closeness between the sender ID and the recipient ID (404). In some embodiments, the Jaccard index is calculated for the sender ID and the recipient ID. The new message text is also compared with the text in the prior message corpus 103 (405). The message modification module 101 identifies candidate collocation texts based on the prior message model, the device ID, the sender ID, the recipient ID, the Jaccard index, and the text comparison (i.e., results of blocks 402-405) (406). The message modification module 101 inserts the candidate collocation texts into the new message text to form a modified message text (407) and calculates a readability score for the modified message text (408). For example, the Dale-Chall, Gunning-Fog, or other applicable techniques can be used to calculate the readability score. If the readability score meets a threshold, then the modified message text is sent to the sender device 110 (410), and the sender 113 can then send the modified message text to the recipient 122 vis the messaging service 102. If the readability score fails to meet the threshold, the message modification module 101 tries to identify a different set of candidate collocation texts and blocks 406-409 are repeated. If, after a configured maximum number of tries the readability score still fails to meet the threshold (409 and 411), the new message text remains unmodified (412). Optionally, the modified message text sent to the sender 113 can be highlighted for the sender's review. Optionally, the messaging client 112 is configured to allow the sender 113 to reject the modifications to the message text, in response to which the messaging client 112 reverts to the original new message text. In some embodiments, a threshold readability score is configured from readability scores from the prior message corpus 103, i.e., it is determined whether the readability score for the modified message text is comparable to the readability of the sender's prior messages.

Figure 5B:

FIGS. 5A-5B illustrate an example message with verbosity enhanced according to some embodiments. As illustrated in FIG. 5A, the message modification module 101 derives an example prior message model 501. When a new message text is received, the message modification module 101 determines the device ID, which indicates that the sender's client device 110 is an Android™ device. The message modification module 101, using the prior message model 501, derives a message model 502 for the new message (402). The message modification module 101 determines the sender ID, recipient ID, and Jaccard index 503 (403-404). The message modification module 101 compares the text in the prior message corpus for the sender ID with the new message text (405) and identifies the collocation texts (406). The collocation texts in the prior message model 501 are illustrated as shaded cells. As illustrates in FIG. 5B, the collocation texts are inserted into the new message text to form the modified message text 504 (407). The original new message texts are illustrated as shaded cells. A readability score is then calculated for the modified message text (408). Assuming that the readability score meets the threshold (409), the modified message text is sent to the sender device 110 (410).

In some embodiments, a combination of the sender client device 110 and the recipient client device 120 is used to determine the level of verbosity enhancement. In some embodiments, the prior message model is configured with a feature that provides a sliding scale of verbosity. The message modification module 101 identifies an optimum set of candidate collocation texts. However, the candidate collocation texts that are inserted into the new message text can be a configurable sub-set. For example, a sub-set of the optimum set of candidate collocation texts can be selected based on a combination of the sender and receiver device ID's.

Figure 7:
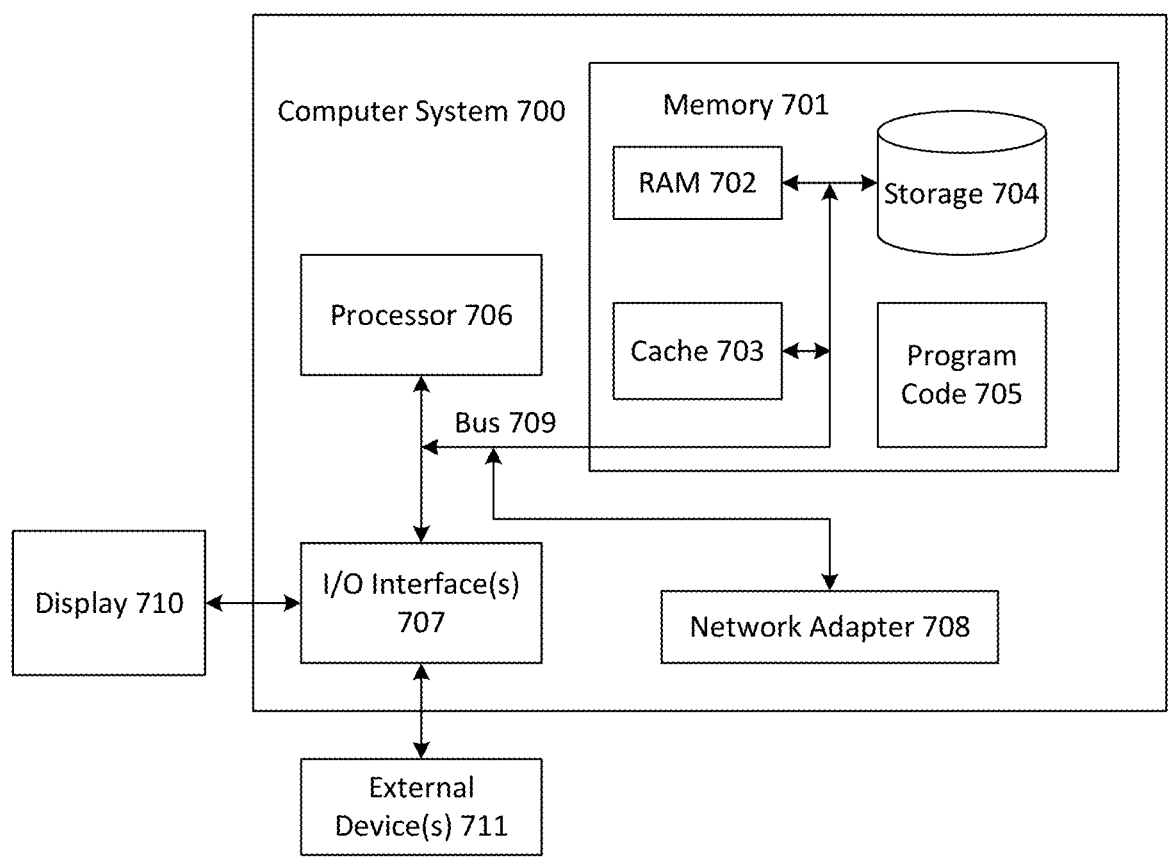
FIG. 7 illustrates a computer system, one or more of which implements various embodiments of the present invention.

FIG. 7 illustrates a computer system, one or more of which implements various embodiments of the present invention. The computer system 700 is operationally coupled to a processor or processing units 706, a memory 701, and a bus 709 that couples various system components, including the memory 701 to the processor 706. The bus 709 represents one or more of any of several types of bus structure, including a memory bus or memory controller, a peripheral bus, an accelerated graphics port, and a processor or local bus using any of a variety of bus architectures. The memory 701 may include computer readable media in the form of volatile memory, such as random access memory (RAM) 702 or cache memory 703, or non-volatile storage media 704. The memory 701 may include at least one program product having a set of at least one program code module 705 that are configured to carry out the functions of embodiment of the present invention when executed by the processor 706. The computer system 700 may also communicate with one or more external devices 711, such as a display 710, via I/O interfaces 707. The computer system 700 may communicate with one or more networks via network adapter 708.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing message verbosity, comprising:

analyzing, by the computing device, a prior message corpus for a sender over a plurality of vectors;

deriving, by the computing device, a prior message model from results of the analysis of the prior message corpus, the prior message model representing behavior of the sender in prior message discourses with different communication device types and different message types;

storing, by the computing device, the prior message model in a message model repository;

receiving, by a computing device, new message text composed by a sender at a sender device;

applying, by the computing device, the prior message model to the new message text;

identifying, by the computing device, a set of candidate texts based on the prior message model;

inserting, by the computing device, the set of candidate texts into the new message text to form modified message text;

validating, by the computing device, a readability of the modified message text; and sending, by the computing device, the modified message text to the sender device.

2. The method of claim 1, wherein the deriving of the prior message model comprises:

modeling, by the computing device, inter-arrival time of prior messages posted by the sender;

determining, by the computing device, a closeness of relationship between the sender and a recipient of the new message text;

performing, by the computing device, a prior message discourse analysis on the prior message corpus between the sender and the recipient from distinct communication device types; and combining, by the computing device, results from the modeling of the inter-arrival time, the determining of the closeness of the relationship, and the prior message discourse analysis into the prior message model.

3. The method of claim 1, wherein the applying of the prior message model to the new message text comprises:

determining, by the computing device, a device identifier for the sender device and deriving a message model for the new message text using the prior message model;

determining, by the computing device, a sender identifier for the sender and a recipient identifier for a recipient of the new message text;

determining, by the computing device, a relationship closeness between the sender identifier and the recipient identifier; and comparing, by the computing device, the new message text with prior message text.

4. The method of claim 1, wherein the identifying of the set of candidate texts and the inserting of the set of candidate texts into the new message text comprise:

identifying, by the computing device, a set of candidate collocation texts based on the prior message model; and inserting, by the computing device, the set of candidate collocation texts into the new message text to form the modified message text.

5. The method of claim 4, wherein the inserting of the set of candidate collocation text comprises:

identifying, by the computing device, a subset of the set of candidate collocation texts based on a combination of a first device identifier for the sender device and a second device identifier for a recipient device of a recipient of the new message text; and inserting, by the computing device, the subset of collocation texts into the new message text to form the modified message text.

6. The method of claim 1, wherein the validating of the readability of modified message text comprises:

calculating, by the computing device, a readability score for the modified message text;

determining, by the computing device, whether the readability score meets a configured threshold; and when the readability score meets the configured threshold, sending, by the computing device, the modified message text to the sender device.

7. A computer program product for enhancing message verbosity, the computer program product comprising a computer readable storage medium having program instructions embodied therewith, the program instructions executable by a processor to cause the processor to:

analyze a prior message corpus for a sender over a plurality of vectors;

derive a prior message model from results of the analysis of the prior message corpus, the prior message model representing behavior of the sender in prior message discourses with different communication device types and different message types;

store the prior message model in a message model repository;

receive new message text composed by a sender at a sender device;

apply the prior message model to the new message text;

identify a set of candidate texts based on the prior message model;

insert the set of candidate texts into the new message text to form modified message text;

validate a readability of the modified message text; and send the modified message text to the sender device.

8. The computer program product of claim 7, wherein in deriving the prior message model, the processor is further caused to:

model inter-arrival time of prior messages posted by the sender;

determine a closeness of relationship between the sender and a recipient of the new message text;

perform a prior message discourse analysis on the prior message corpus between the sender and the recipient from distinct communication device types; and combine results from the modeling of the inter-arrival time, the determining of the closeness of the relationship, and the prior message discourse analysis into the prior message model.

9. The computer program product of claim 7, wherein when applying the prior message model to the new message text, the processor is further caused to:

determine a device identifier for the sender device and deriving a message model for the new message text using the prior message model;

determine a sender identifier for the sender and a recipient identifier for a recipient of the new message text;

determine a relationship closeness between the sender identifier and the recipient identifier; and compare the new message text with prior message text.

10. The computer program product of claim 7, wherein in identifying the set of candidate texts and in inserting the set of candidate texts into the new message text, the processor is further caused to:

identify a set of candidate collocation texts based on the prior message model; and insert the set of candidate collocation texts into the new message text to form the modified message text.

11. The computer program product of claim 10, wherein in inserting the set of candidate collocation text, the processor is further caused to:

identify a subset of the set of candidate collocation texts based on a combination of a first device identifier for the sender device and a second device identifier for a recipient device of a recipient of the new message text; and insert the subset of collocation texts into the new message text to form the modified message text.

12. The computer program product of claim 7, wherein in validating the readability of modified message text, the processor is further caused to:

calculate a readability score for the modified message text;

determine whether the readability score meets a configured threshold; and when the readability score meets the configured threshold, send the modified message text to the sender device.

13. A system comprising:

a processor; and a computer readable storage medium having program instructions embodied therewith, the program instructions executable by the processor to cause the processor to:

analyze a prior message corpus for a sender over a plurality of vectors;

derive a prior message model from results of the analysis of the prior message corpus, the prior message model representing behavior of the sender in prior message discourses with different communication device types and different message types;

store the prior message model in a message model repository;

receive new message text composed by a sender at a sender device;

apply the prior message model to the new message text;

identify a set of candidate texts based on the prior message model;

insert the set of candidate texts into the new message text to form modified message text;

validate a readability of the modified message text; and send the modified message text to the sender device.

14. The system of claim 13, wherein in deriving the prior message model, the processor is further caused to:

model inter-arrival time of prior messages posted by the sender;

determine a closeness of relationship between the sender and a recipient of the new message text;

perform a prior message discourse analysis on the prior message corpus between the sender and the recipient from distinct communication device types; and combine results from the modeling of the inter-arrival time, the determining of the closeness of the relationship, and the prior message discourse analysis into the prior message model.

15. The system of claim 13, wherein when applying the prior message model to the new message text, the processor is further caused to:

determine a device identifier for the sender device and deriving a message model for the new message text using the prior message model;

determine a sender identifier for the sender and a recipient identifier for a recipient of the new message text;

determine a relationship closeness between the sender identifier and the recipient identifier; and compare the new message text with prior message text.

16. The system of claim 13, wherein in identifying the set of candidate texts and in inserting the set of candidate texts into the new message text, the processor is further caused to:

identify a set of candidate collocation texts based on the prior message model; and insert the set of candidate collocation texts into the new message text to form the modified message text.

17. The system of claim 13, wherein in inserting the set of candidate collocation text, the processor is further caused to:

identify a subset of the set of candidate collocation texts based on a combination of a first device identifier for the sender device and a second device identifier for a recipient device of a recipient of the new message text; and insert the subset of collocation texts into the new message text to form the modified message text.

* * * * *